(12) United States Patent
Leung

(10) Patent No.: US 7,322,581 B2
(45) Date of Patent: Jan. 29, 2008

(54) CATERPILLAR TYPE BICYCLE

(76) Inventor: Kwai Chung Leung, Rm 02, Block B, 14/F., Winner Centre, 333 Chai Wan Road, Chai Wan, Hong Kong (CN)

( * ) Notice: Subject to any disclaimer, the term of this patent is extended or adjusted under 35 U.S.C. 154(b) by 159 days.

(21) Appl. No.: 11/343,468

(22) Filed: Jan. 30, 2006

(65) Prior Publication Data

US 2007/0096407 A1  May 3, 2007

(51) Int. Cl.
*B62K 13/00* (2006.01)

(52) U.S. Cl. .............................. 280/7.12; 280/8; 280/9; 280/7.14; 280/12.1; 280/845

(58) Field of Classification Search ............... 280/12.1, 280/12.12, 7.12, 8–11, 845, 13, 14, 7.14, 280/7.15
See application file for complete search history.

(56) References Cited

U.S. PATENT DOCUMENTS

| | | | | |
|---|---|---|---|---|
| 2,433,173 | A * | 12/1947 | Tucker | 280/11 |
| 3,650,342 | A * | 3/1972 | Pushnig et al. | 180/185 |
| 3,872,938 | A * | 3/1975 | DeGroot | 180/185 |
| 5,738,361 | A * | 4/1998 | Landucci | 280/12.14 |
| 6,164,670 | A * | 12/2000 | Abarca et al. | 280/12.14 |
| 6,279,923 | B1 * | 8/2001 | Cardillo et al. | 280/12.14 |
| 6,511,079 | B1 * | 1/2003 | Charles, Sr. | 280/12.14 |
| 6,663,117 | B2 * | 12/2003 | Cheney et al. | 280/12.14 |
| 6,783,133 | B1 * | 8/2004 | Araujo | 280/7.14 |
| 2007/0096407 | A1 * | 5/2007 | Leung | 280/7.12 |

* cited by examiner

Primary Examiner—Christopher P. Ellis
Assistant Examiner—Vaughn T. Coolman
(74) Attorney, Agent, or Firm—Kenyon & Kenyon LLP

(57) ABSTRACT

The present invention provides a caterpillar type bicycle, comprising a bicycle frame, a saddle, a steering handle, and a sprocket pedal power mechanism, as well as a caterpillar type driving structure (A) and a multi-functional switchable front guide mechanism (B), wherein the caterpillar type driving structure (A) comprises a driving wheel drivingly connected to the sprocket pedal power mechanism, an auxiliary wheel pivotally supported on the tail of the bicycle frame, a caterpillar provided on the driving wheel and the auxiliary wheel, and a connecting rod for determining the positional relation between the driving wheel and the auxiliary wheel; the multi-functional switchable front guide mechanism (B) comprises switch means fastened to at the distal end of the a front rod of the bicycle frame, a front guide rolling wheel rotatably connected to a pivotal shaft provided by the switch means, and a front guide sliding board fixedly connected to two hinge support points provided by the switch means. When the multi-functional switchable front guide mechanism (B) is in the first state, the pivotal shaft is at a level higher than the two hinge support points that are at the same level so that the front guide rolling wheel is off the ground and the front guide sliding board touches the ground in a flat manner; when the multi-functional switchable front guide mechanism (B) is in the second state, both of the two hinge support points are higher than the pivotal shaft such that the front guide rolling wheel touches the ground and the front guide sliding board is off the ground.

3 Claims, 2 Drawing Sheets

CATERPILLAR TYPE BICYCLE

TECHNICAL FIELD

The present invention relates to a caterpillar type bicycle, particularly to a caterpillar type bicycle with a front guide mechanism having a rolling wheel and a sliding board, wherein the rolling wheel and the sliding board are switched to touch the ground by a switch structure without disassembling.

BACKGROUND ART

In general, an ordinary bicycle comprises portions such as a bicycle frame, a steering handle, a front guide rolling wheel, a rear driving wheel, and a sprocket drive mechanism of pedal power, adapted to be used as a vehicle ridden on smooth and solid road surface and to be prevailingly used for leisure and body building activities.

An ordinary bicycle travels forward in a manner that the front and rear wheels roll forward. During travel the front and rear wheels contact the road surface at one point so that weight of the bicycle and the load thereof and momentum all concentrate at the very small contact area between the wheels and the road surface. When confronted with a loose and soft or wet and slippery road surface on snowfield, grassland, a sandy land or a muddy land, the front and rear wheels of the bicycle are likely to sink into the road or uncontrollably skid, so that scope of use of the bicycle is limited.

In order to allow a user to ride a vehicle similar to an ordinary bicycle on a loose, soft, wet, or slippery road surface such that leisure or body building activities can be extended to snowfield, grassland, a sandy land or a muddy land, there is a need to improve the currently existing designs of front and rear wheels of an ordinary bicycle, for example, by increasing contact area between the rear driving wheel and the road surface, or changing the front guide rolling wheel into a front guide sliding board, so as to enhance the capability of preventing sinking and reducing the out-of-control cases.

The utility model patent CN2628412Y discloses a "multifunctional snowfield sports body-building bicycle", wherein the front guide rolling wheel of an ordinary bicycle is changed into a sliding board connected to the distal end of the front rod of the bicycle frame by a suspension structure, and the rear wheel is not modified. The utility model is designed to improve the capability of an ordinary bicycle preventing out-of-control skidding when traveling on a snowfield, and does not provide any technical measures to solve the wheel sinking problem when an ordinary bicycle travels on a soft and loose road surface.

Another utility model patent CN2262524Y discloses a "caterpillar bicycle". Obviously the utility model is targeted at the wheel sinking problem when an ordinary bicycle travels on a soft and loose road surface and put forwards that the rear driving wheel is changed in a manner that two sets of track wheels are arranged side by side and each set of track wheel is formed by three wheels provided with a caterpillar, whereby "the contact area between the wheels and the road surface is greatly increased" and "the frictional force between the wheels and the road surface is greatly increased". But, just for the reason, this modification deprives the bicycle of being flexibly operated and easily steered.

Therefore, the art of record does not provide a practical and feasible technical solution to the aforesaid problems.

SUMMARY OF THE INVENTION

In order to solve the aforesaid problems, the present invention aims to provide a caterpillar type bicycle, comprising a bicycle frame, a saddle, a steering handle, and a sprocket pedal power mechanism, as well as a caterpillar type driving structure A and a multi-functional switchable front guide mechanism B that are not with a conventional bicycle, wherein the caterpillar type driving structure A comprises a driving wheel drivingly connected to the sprocket pedal power mechanism, an auxiliary wheel pivotally supported on the tail of the bicycle frame, a caterpillar provided on the driving wheel and the auxiliary wheel, and a connecting rod for determining the positional relation between the driving wheel and the auxiliary wheel; the multi-functional switchable front guide mechanism B comprises switch means fastened to at the distal end of the a front rod of the bicycle frame, a front guide rolling wheel rotatably connected to a pivotal shaft provided by the switch means, and a front guide sliding board fixedly connected to two hinge support points provided by the switch means. The multi-functional switchable front guide mechanism B provides a first switch state and a second switch state; in the first state, the pivotal shaft is at a level higher than the two hinge support points that are at the same level so that the front guide rolling wheel is off the ground and the front guide sliding board touches the ground in a flat manner; in the second state, both of the two hinge support points are higher than the pivotal shaft such that the front guide rolling wheel touches the ground and the front guide sliding board is off the ground.

The caterpillar type driving structure A provide a larger touch-ground contact area for the bicycle so that the bicycle can easily travel on a loose soft road surface and a stronger anti-sink capability is provided. The multi-functional switchable front guide mechanism B provides a more flexible front guide manner for the bicycle, i.e. an ordinary rolling wheel can be used or a sliding board is used as practically needed so as to improve the front guide controlling capability under different road surface conditions.

BRIEF INTRODUCTION OF DRAWINGS

Preferred embodiments according to the present invention will be described in detail with the following figures so as to clearly exhibit technical features and technical effects thereof.

PREFERRED EMBODIMENTS

Figure 1:
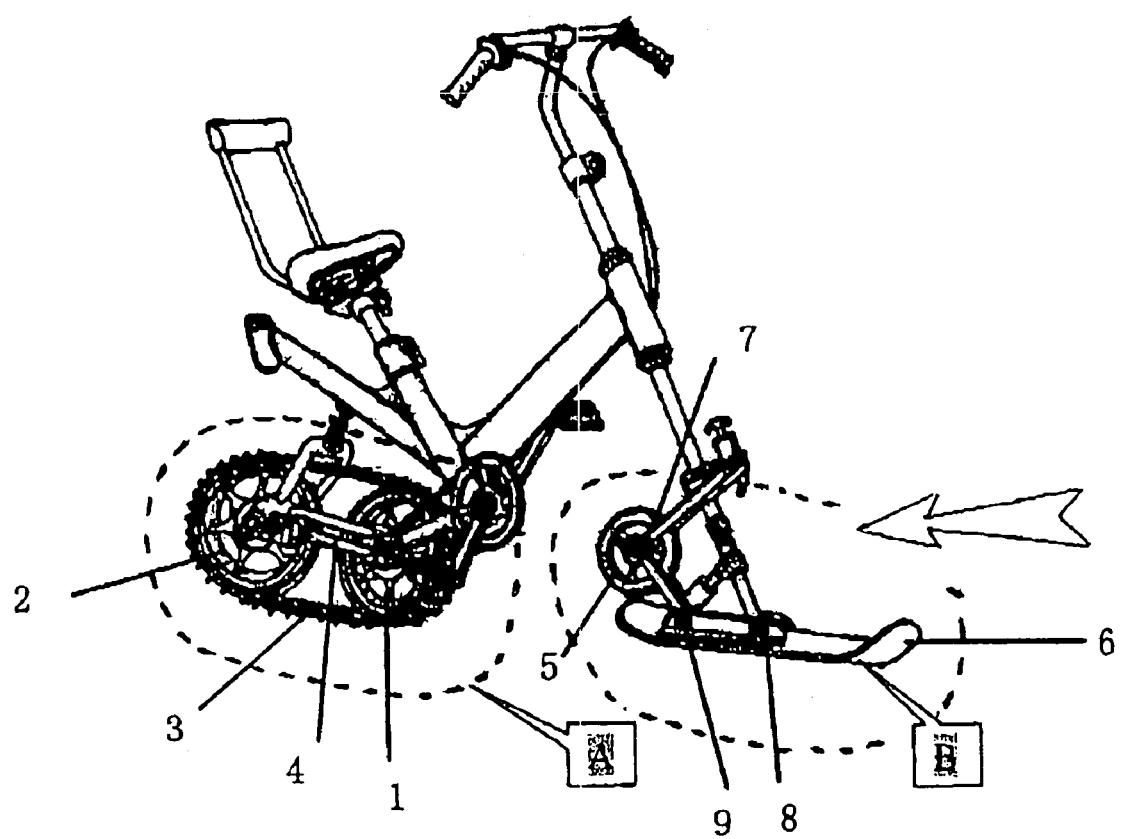
FIG. 1 is a schematic view of the multi-functional caterpillar type bicycle according to the present invention, wherein the front switch mechanism is in a first state of allowing a front guide sliding board connected thereto to touch the ground.

FIG. 1 shows a preferred embodiment of the multi-functional caterpillar type bicycle according to the present invention. The bicycle comprises a bicycle frame, a saddle on the frame, a steering handle, and a speed change controller and a brake controller that are attached to the steering handle and are identical with those of a conventional bicycle. Besides, the bicycle according to the present invention uses a caterpillar type driving structure A and a multi-functional switchable front guide mechanism B respectively instead of a single driving rear wheel and a front guide rolling wheel as used on a conventional bicycle.

As shown in FIG. 1, the caterpillar type driving structure A comprises a driving wheel 1 drivingly connected to an ordinary pedal sprocket driving structure, an auxiliary wheel 2 pivotally supported on the tall of the bicycle frame, and a caterpillar 3 provided on the driving wheel 1 and the auxiliary wheel 2. The positional relation between the driving wheel 1 and the auxiliary wheel 2 in the driving structure A is determined via a connecting rod 4. However, the caterpillar type driving structure A of the multi-functional caterpillar type bicycle according to the present invention is not limited to the above design and can be modified as practically needed. For example, the bicycle can be designed in a manner that two or more sets of caterpillar type driving structures A are arranged parallel to one another and jointly driven by the pedal sprocket driving structure; alternatively, the positional relation between the driving wheel 1 and the auxiliary wheel 2 can be altered; alternatively, the number and relative proportion in dimensions of the driving wheel 1 or the auxiliary wheel 2 can be altered.

As shown in FIG. 1, the multi-functional switchable front guide mechanism B of the multi-functional caterpillar type bicycle according to the present invention comprises a swing arm linkage switch means fastened to at the distal end of the a front rod of the bicycle frame, a front guide rolling wheel 5 rotatably connected to a pivotal shaft 7 provided by the switch means, and a front guide sliding board 6 fixedly connected to two hinge support points 8, 9 provided by the switch means. In the switchable front guide mechanism B in the first state as shown in FIG. 1, the pivotal shaft 7 is at a level higher than the two hinge support points 8, 9 so that the front guide rolling wheel 5 is off the ground and the two hinge support points 8, 9 are at the same lower level such that the front guide sliding board 6 touches the ground in a flat manner. In this state, the multi-functional caterpillar type bicycle according to the present invention can realize traveling in a manner of a sliding front guide and caterpillar rolling rear drive, different from an ordinary bicycle.

Figure 2:
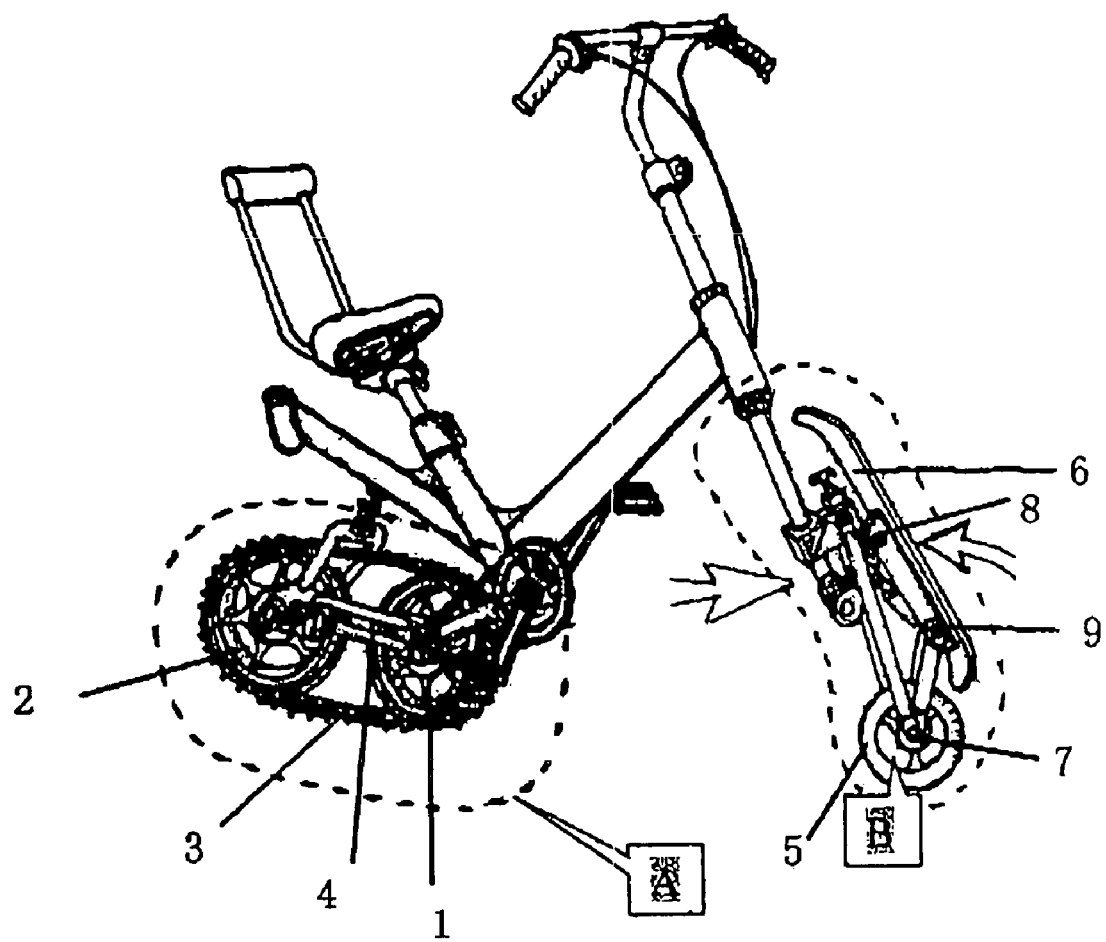
FIG. 2 is a schematic view of the multi-functional caterpillar type bicycle according to the present invention, wherein the front switch mechanism is in a second state of allowing a front guide rolling wheel connected thereto to touch the ground.

FIG. 2 shows the multi-functional switchable front guide mechanism B of the multi-functional caterpillar type bicycle according to the present invention in the second state: the driving shaft 7 in the switch structure becomes lower than the two hinge support points 8, 9 and the two hinge support points 8, 9 are switched to higher positions such that the front guide rolling wheel 5 touches the ground and the front guide sliding board 6 is off the ground. In the second state, the multi-functional caterpillar type bicycle according to the present invention travels in an ordinary rolling manner.

It is understood that the multi-functional switchable front guide mechanism B aims to allow the switch front guide member, i.e., the rolling wheel and the sliding board, to touch the ground, and the multi-functional switchable front guide mechanism B is not limited to the swing arm linkage form as shown in the figures: it can employ any design capable of allowing the above switch front guide member to touch the ground, for example, an expandable and retractable snap fitting design.

The invention claimed is:

1. A multi-functional caterpillar type bicycle, comprising:
a bicycle frame, a saddle, a steering handle, and a sprocket pedal power mechanism;
further comprising:
a caterpillar type driving structure (A), comprising a driving wheel (1) drivingly connected to the sprocket pedal power mechanism, at least one auxiliary wheel (2) pivotally supported on a tail of the bicycle frame, a caterpillar (3) provided on the driving wheel (1) and the auxiliary wheel (2), and a connecting rod (4) for determining the positional relation between the driving wheel (1) and the auxiliary wheel (2);
a multi-functional switchable front guide mechanism (B), comprising switch means fastened to a distal end of a front rod of the bicycle frame, a front guide rolling wheel (5) rotatably connected to a pivotal shaft (7) provided by the switch means, and a front guide sliding board (6) fixedly connected to two hinge support points (8, 9) provided by the switch means;
characterized in that the switch means in the multi-functional switchable front guide mechanism (B) provides a first switch state and a second switch state; in the first switch state, the pivotal shaft (7) is at a first level higher than the two hinge support points (8, 9) so that the front guide rolling wheel (5) is off the ground and the front guide sliding board (6) touches the ground in a flat manner; in the second switch state, both of the two hinge support points (8, 9) are at a second level higher than the pivotal shaft (7) such that the front guide rolling wheel (5) touches the ground and the front guide sliding board (6) is off the ground.

2. The multi-functional caterpillar type bicycle as claimed in claim 1, characterized in that a speed change controller and a brake controller are attached to the steering handle.

3. The multi-functional caterpillar type bicycle as claimed in claim 1, characterized in that the caterpillar type driving structure (A) comprises more than one said auxiliary wheel (2).

* * * * *